United States Patent [19]
Hostetler et al.

[11] Patent Number: 5,938,301
[45] Date of Patent: Aug. 17, 1999

[54] TRACK ASSEMBLY FOR TRACK LAYING VEHICLE OR IMPLEMENT

[76] Inventors: Dewey Hostetler, R.R. 2, Box 77; Raymond Forpahl, 703 N. Walnut, both of Harper, Kans. 67058

[21] Appl. No.: 08/869,863

[22] Filed: Jun. 5, 1997

[51] Int. Cl.[6] .................................................. B62D 55/12
[52] U.S. Cl. ........................... 305/199; 305/110; 305/115
[58] Field of Search ..................................... 305/100, 107, 305/109, 110, 115, 195, 199, 165, 167, 178, 184

[56] References Cited

U.S. PATENT DOCUMENTS

| | | | |
|---|---|---|---|
| 2,560,307 | 7/1951 | Slemmons | 305/110 |
| 3,155,436 | 11/1964 | Bonmartini | 305/165 X |
| 3,888,132 | 6/1975 | Russ, Sr. | 305/178 X |
| 4,830,439 | 5/1989 | Collins et al. | 305/110 |
| 5,078,326 | 1/1992 | Wright | 305/195 X |
| 5,352,029 | 10/1994 | Nagorcka | 305/115 X |

OTHER PUBLICATIONS

Author: Unknown; Title: *Original Cat Challenger Goes on Display*; Item Title: *Farm Show*; Date: Sep.–Oct., 1996; p. 25; vol. 20, No. 5, 1996; Publisher: Mark Newhall; City of Publication: Lakeville, Minn. (See Exhibit "A").

Author: Unknown; Title: *Skid Steer Tracks Made From Used Tractor Tires;* Item Title: *The Best of Farm Show;* Date: 1997 Edition; p. 29; Publisher: Mark Newhall; City of Publication: Lakeville, Minn. (See Exhibit "B").

Author: Unknown; Title: *New Rubber Track System Offer Cushioned Suspension;* Item Title: *Farm Show;* Date: Sep.–Oct., 1995; p. 18; vol. 19, No. 5, 1995; Publisher: Mark Newhall; City of Publication: Lakeville, Minn. (See Exhibit "C").

Author: Unknown; Title: *Home–Built Crawler Rides On "Tire Tread" Tracks;* Item Title: *Farm Show;* Date: Jul.–Aug., 1996, p. 11; vol. 20, No. 4, 1996; Publisher: Mark Newhall; City of Publication: Lakeville, Minn. (See Exhibit "A").

Author: Unknown; Title: *"Air Bag" Tracks for Spreaders, Wagons;* Item Title: *Farm Show;* Date: Nov.–Dec., 1995; p. 17; vol. 19, No. 6, 1995; Publisher: Mark Newhall; City of Publication: Lakeville, Minn. (See Exhibit "E").

*Primary Examiner*—Russell D. Stormer
*Attorney, Agent, or Firm*—Kenneth Jack

[57] ABSTRACT

A track assembly for a track laying vehicle or implement, such assembly comprising a rotatable hub having a plurality of track support members, each such member having an outwardly curved outer surface; such hub further having an inner suspending and positioning means, such means being capable of fixedly suspending such members in a circular pattern; such means suspending and positioning such members in a circular pattern; and, a continuous loop track, having an exterior ground engaging side, and having an outwardly curved interior hub engaging side, the hub engaging side of such track being in frictional contact with the outer surfaces of a plurality of such members.

21 Claims, 8 Drawing Sheets

# TRACK ASSEMBLY FOR TRACK LAYING VEHICLE OR IMPLEMENT

FIELD OF THE INVENTION

This invention relates to mobile construction or farm equipment drive assemblies which incorporate rubberized or elastomeric ground engaging continuous loop tracks.

BACKGROUND OF THE INVENTION

Utilization of continuous loop rubber or elastomeric tracks as the ground engaging elements of mobile farm and construction implements and vehicles is known. Such tracks may be fabricated within a rubber molding press, much like common vehicle tires are molded. Such tracks offer durability and shock absorbing characteristics, while eliminating mechanical wear and tear and breakage associated with mechanically linked segmented tracks. A drawback or disadvantage of molded, continuous loop rubber tracks is that they are relatively expensive to fabricate, and may require frequent total replacement. In the event that such tracks are damaged, such tracks ordinarily cannot be repaired, but must be discarded and replaced at substantial expense. Expenses associated with molding rubber continuous loop tracks for use with track laying vehicles or construction equipment has lead to utilization of used construction vehicle tires as an inexpensive source of rubber tracks. It is known that the sidewalls of a 38-inch farm tractor tire may be cut away, leaving only the tread portion, approximately 18 inches wide. Such a tread loop, when stretched over a pair of 24-inch diameter hubs will provide approximately 7½ feet of track surface for ground contact. Thus, a common farm tractor tire includes sufficient tread material to provide a ground engaging continuous loop track for a vehicle or mobile implement.

Utilizing the tread portion of construction or farm vehicle tires to supply such rubber tracks provides significant economic benefits. For example, a tractor tire having sidewall damage may be unusable as a tractor tire; but may have a tread portion in perfect condition which may serve as a continuous loop track. Such construction or farm vehicle tires often have a negative valve to an equipment operator needing usable tires, and may be obtained at little or no cost.

A track laying vehicle or implement typically has pairs of laterally opposed forward and rear track driving and guiding hubs. For example, where a track laying vehicle has a rearward pair of track driving hubs and a forward pair of track guiding hubs, the tracks are installed over the hubs so that each track extends forwardly and tangentially over the upper radial surface of the track guiding hub, thence extending 180° around the forward radial surface of the track guiding hub, thence extending tangentially rearward along the ground to the lower radial surface of the rear track driving hub, thence extending radially 180° to the upper radial surface of the track driving hub, thence extending forwardly to complete a continuous circuit. Where large construction vehicle tires, such as a 38-inch tractor tire, are used as the source material for a continuous loop track, it is known that pairs of common automobile tires may serve as such track guiding and driving hubs. Where such tires are utilized as the track guiding or driving hubs, two configurations are known. In one such configuration the construction vehicle tire is narrowly cut to match the width of a single automobile tire, such tires serving as forward and rear hubs. Such configuration requires attachment of inwardly extending steel retainer tabs to the outer edges of the track. As such a track having steel retainer tabs travels in a circuit around the forward and rear tire hubs, the tabs hold the track in place over the outer peripheries of the hubs. A second known configuration constructs tire hubs out of paired automobile tires, stacked side by side. In such configuration, a single row of steel retainer tabs are fastened onto the interior surface of the track so that as the track travels in a circuit around the hubs, the tabs travel in progression through the annular channels between the tires, holding the track in place upon the tire hubs.

A drawback or functional deficiency of utilization of common tires as track driving and guiding hubs is that such hubs tend to "clog" when driven through mud or snow, resulting in loss of traction. Snow or mud tends to accumulate between the exterior radial surfaces of the tire hubs and the interior surface of the track, resulting in slippage, and interfering with delivery of power to the ground.

Another drawback or deficiency resulting from utilization of common tires as track driving and guiding hubs is the necessity of installing track retaining steel tabs or flanges upon the track. Ordinarily, a steel tabs or flange must be fastened by screws or bolts at six inch intervals around the entire circumferential length of the track. In order to utilize vehicle tires to drive a track cut from a 38-inch tractor tire, approximately 36 retainer tabs are necessary where dual stacked tire hubs are used, and 72 tabs are necessary where single tire hubs are used. Installing track retaining tabs upon a track is both time consuming and expensive. Utilization of tires as hubs is also undesirable because bolts or screws used to install track retaining tabs creates multiple wear points in the track. Bolts and screws extending into the track degrade the integrity of the track. Also, installation of track retaining tabs is an expensive and time consuming procedure. Also, such tabs slowly loosen and work their way out of the track, and must be replaced.

The instant inventive track assembly solves the above problems by providing a hub which allows inward ingestion of ground material such as mud and snow, preventing clogging and slipping; the hub being capable of securely retaining a track cut from a construction vehicle tire without installation of retainer tabs.

PRIOR ART PATENTS

U.S. Pat. No. 4,953,921 issued Sep. 4, 1990, to Burns discloses an endless track having a specialized round engaging surface.

U.S. Pat. No. 5,352,029 issued Oct. 4, 1994, to Nagorcka discloses an elastomeric work vehicle.

U.S. Pat. No. 1,727,089 issued Sep. 3, 1929, to Woick discloses a tracked vehicle having a textile fabric track with rubberized protrusions.

U.S. Pat. No. 4,459,932 issued Jul. 17, 1984, to Hildebrand discloses a tracked all-terrain and amphibious vehicle.

None of the above disclosed patents teaches or discloses the novel inventive and unique aspects and features of the present invention.

BRIEF SUMMARY OF THE INVENTION

The present inventive track assembly preferably comprises a forward track guiding hub and a rearward track driving hub. Each such hub preferably comprises a central circular disk approximately 24 inches in diameter and approximately one-half inch thick. The central circular disk has a central axis of rotation about which are drilled 4, 5, or 6 lug receiving apertures for mounting the hub upon or rotor having threaded lugs. The outer peripheral edge of the central circular disk preferably is concavely or inwardly scalloped, the curved surfaces of the scalloped edge being circumferentially spaced so that the outer peripheral edge of the disk has sixteen high points evenly spaced therearound. Sixteen cylindrical crossbars having circular cross sections are fixedly welded at such highpoints upon the outer periphery of the central circular disk. Each of the crossbars is bent into a smooth arc matching the internal curvature of the tread portion of a construction vehicle tire selected as the source of a continuous loop track. Each bar is positioned on the central cylindrical disk so that the points of contact between the bars and the disk are at the bars' midpoints, so that each bar initially extends perpendicularly from the sides of the disk, and so that the arc of each bar extends inward from such midpoint. The bars preferably are cut to length according to the width of the track to be driven or guided by the hub.

The opposing ends of the sixteen crossbars so suspended by the circular disk form opposing circular patterns, one on each side of the central circular disk. A pair of flange rings rigidly support the ends of the bars, each such ring extending radially outward to form a track retaining flange to assure that a track driven or guided by the hub does not slide off of the hub. The flange rings are fitted so that the radial distance from the axis of rotation of the central circular disk to the outer tread surface of a track overlying the hub is approximately one-half inch greater than the outside radial dimensions of the rings. Hubs having flange rings so sized allow the track to raise the outer periphery of the rings above ground level, shielding the rings from damaging contact with the ground.

The inside diameter of each of the flange rings is similarly fitted so that its inner radial surface underlies the inner edges of the crossbars by approximately one-half inch. By so adjusting the size of the inner openings of the rings, sufficient structural support of the ends of the crossbars is provided, while providing an opening large enough for free emission of mud and snow ingested into the interior space of the hub.

A pair of hubs constructed as described above may be easily installed, for example, upon a track faying vehicle or implement having a rear drive axle and a forward guide axle, each axle having a rotor rotatably mounted upon its ends, each rotor having threaded lugs extending therefrom. The lug receiving apertures of the central circular disks of the nubs are aligned over the threaded lugs, the hubs are mounted over the lugs, and threaded lug nuts are threadedly tightened thereon, fixing the hubs in place. The central openings of the flange rings provide clearance allowing the lug nuts to be tightened with an airwrench.

Preferably, the forward axle and attached hubs may be slidably positioned forward and rearward by means of a screw tightener; such tightener being capable of alternately drawing apart the forward and rear hubs, tightening tracks installed thereon, and drawing together the hubs for removal and replacement of the tracks. Also preferably, such a track assembly includes a pair of small automobile or trailer tires rotatably mounted between the forward and rear hubs and aligned so that the plane of rotation of the idler wheels is parallel with the plane of rotation of the hubs.

A typical 38 inch tractor tire is an adequate source of material for a continuous loop track to be installed around the hubs as described above. Such a tire may be converted into a track by cutting away both of its sidewalls. A reciprocating "sawsall" saw may be utilized to quickly and efficiently cut around the circumference of such a tractor tire.

After cutting away the sidewalls of the tire, the remaining continuous loop track is draped over the forward and rear hubs and draped under the lower surface of the idler wheels, the track being positioned so that its side edges lie between the flanges of the flange rings of the hubs. With the track so positioned, tightening screws are turned, drawing apart the hubs and tightening the track over the assembly. Upon such assembly, the track assembly is ready for use.

In operation, the track cycles in a continuous loop over the respective forward and rearward radial peripheries of the forward and rear hubs and beneath the lower radial peripheries of the idler wheels. As the hubs turn, their crossbars in quick succession come into frictional and supporting contact with the interior surface of the track, the rear driving hub thereby transferring a driving force to the track. In operation, material such as mud or snow may fall onto the interior surface of the track and become ingested into the interior spaces of the hubs. The open spacing between the crossbars of the hubs and the central openings of the flange rings allow for continuous emission of such materials, preventing "clogging" of the hubs. Thus, continuous frictional contact between the crossbars and the interior surface of the track is assured. Where snow conditions cause snow to be easily packed, snow diverters extending from the crawler track vehicle or implement into the interior spaces of the hubs are installed. Such snow diverters cause snow ingested into the interior spaces of the hubs to continuously pass outwardly through the central openings of the flange rings.

Accordingly, it is an object of the present invention to provide a track assembly for track laying vehicles or implements, the assembly being capable of utilizing a track derived from a vehicle tire; and the assembly including hubs having a multiplicity of crossbars, the crossbars being outwardly curved for enhanced frictional and supporting contact between the interior surface of the track and the exterior surface of the bars.

It is a further object of the present invention to provide such a track assembly including open spacing between crossbars and between central openings of outer support rings for free ingestion and emission of materials such as mud or snow, for the prevention of "clogging."

It is a further object of the present invention to provide such a track assembly including radially extending flanges for retention of the track.

It is a further object of the present invention to provide such a track assembly including snow diverters assuring continuous outward passage of snow ingested into the interior spaces of the hubs.

It is a further object of the present invention to provide such a track assembly including a track tightening and loosening means for alternately drawing apart such hubs for tightening such a track, and loosening such hubs for removal and replacement of such a track.

It is a further object to provide such a track assembly, including idler wheels rotatably mounted between the forward and rear hubs, the idler wheels being capable of providing downwardly directed support of the track along its ground engaging surface.

Other and further objects benefits and advantages of the present track assembly invention will become apparent to persons skilled in the relevant art upon review of the Detailed Description which follows, and upon review of the appended drawings.

DETAILED DESCRIPTION OF THE PREFERRED EMBODIMENT

Figure 5:
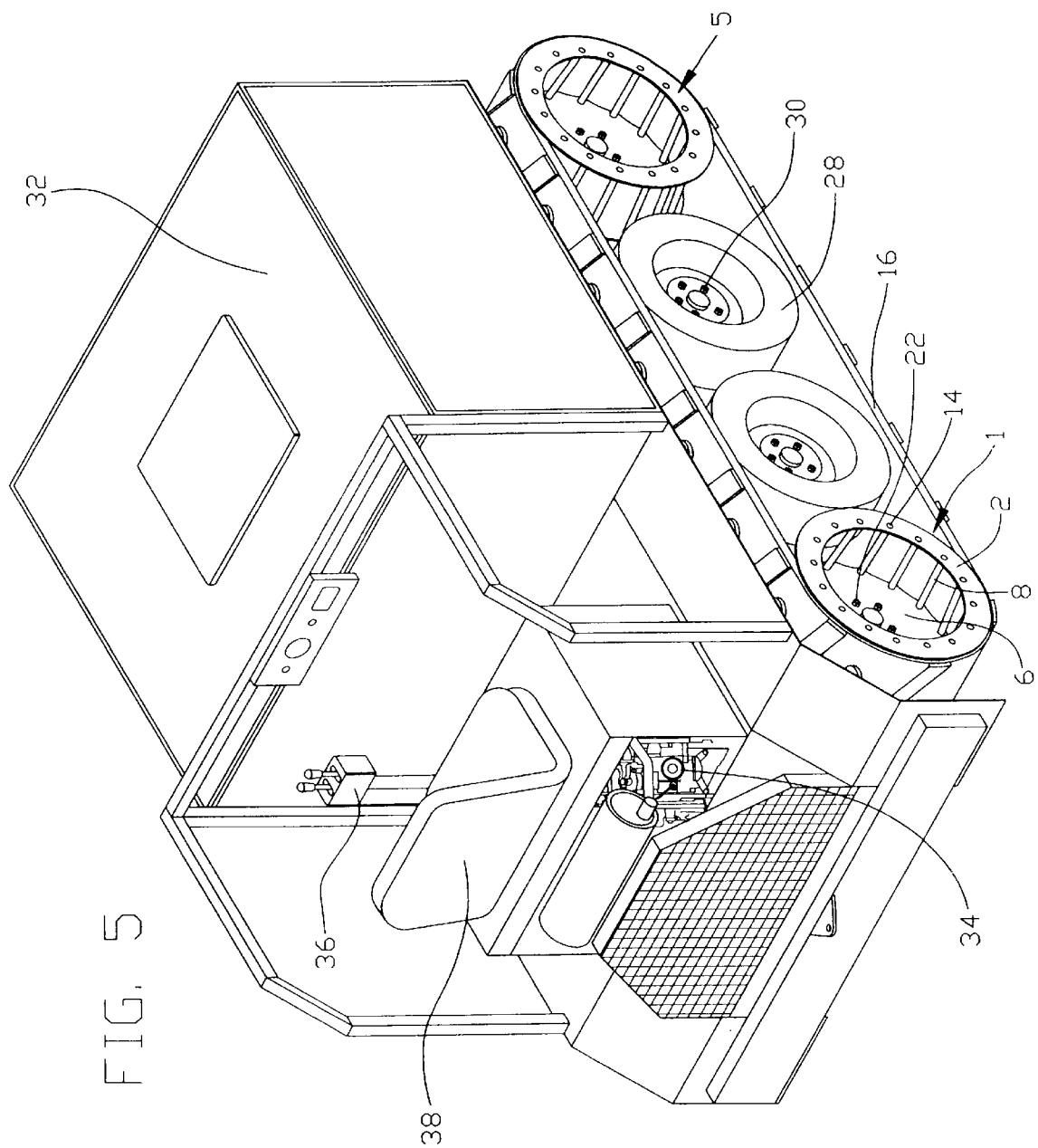
FIG. 5 is an isometric view of an exemplary track laying vehicle having installed thereon the track assembly.

Referring now to the drawings, and in particular to FIG. 5, a track laying vehicle is depicted, such vehicle having a tank 32 for collecting sap from maple trees. Such vehicle is exemplary only; the instant inventive track assembly being applicable in general to vehicles and mobile equipment which are supported and driven by ground engaging continuous loop tracks.

In northern climates of the United States where maple syrup production is an established industry, it is often necessary to move large tree sap collecting vessels in and about maple tree groves for the collection of sap drippings from the maple trees. Such collection activities commonly are necessary during times when dirt roads and trails are muddy or covered with snow. During such times, the tires of common wheel driven tractors pulling sap collecting trailers may sink below ground level, rendering such tractors immobile. Continuous loop tracks 16 increase the ground engaging surface area, reducing the tendency of the vehicle to sink into snow or mud.

In operation, a track laying vehicle such as is depicted in FIG. 5 is driven by an operator seated in an operator's seat 38. An internal combustion engine 34 supplies power to an hydraulic power system, which includes a pair of two way hydraulic motors, not shown; each motor being mounted upon frame members of the vehicle and having drive linkage for rotatably driving a pair of rear drive hubs 1. Upon manipulation of manual controls 36, an operator seated in the seat 38 may variably control the speed and direction of the hydraulic motors for simultaneous forward or rearward rotation of the hubs 1, or for opposing rotatable motion of such hubs.

Figure 4:
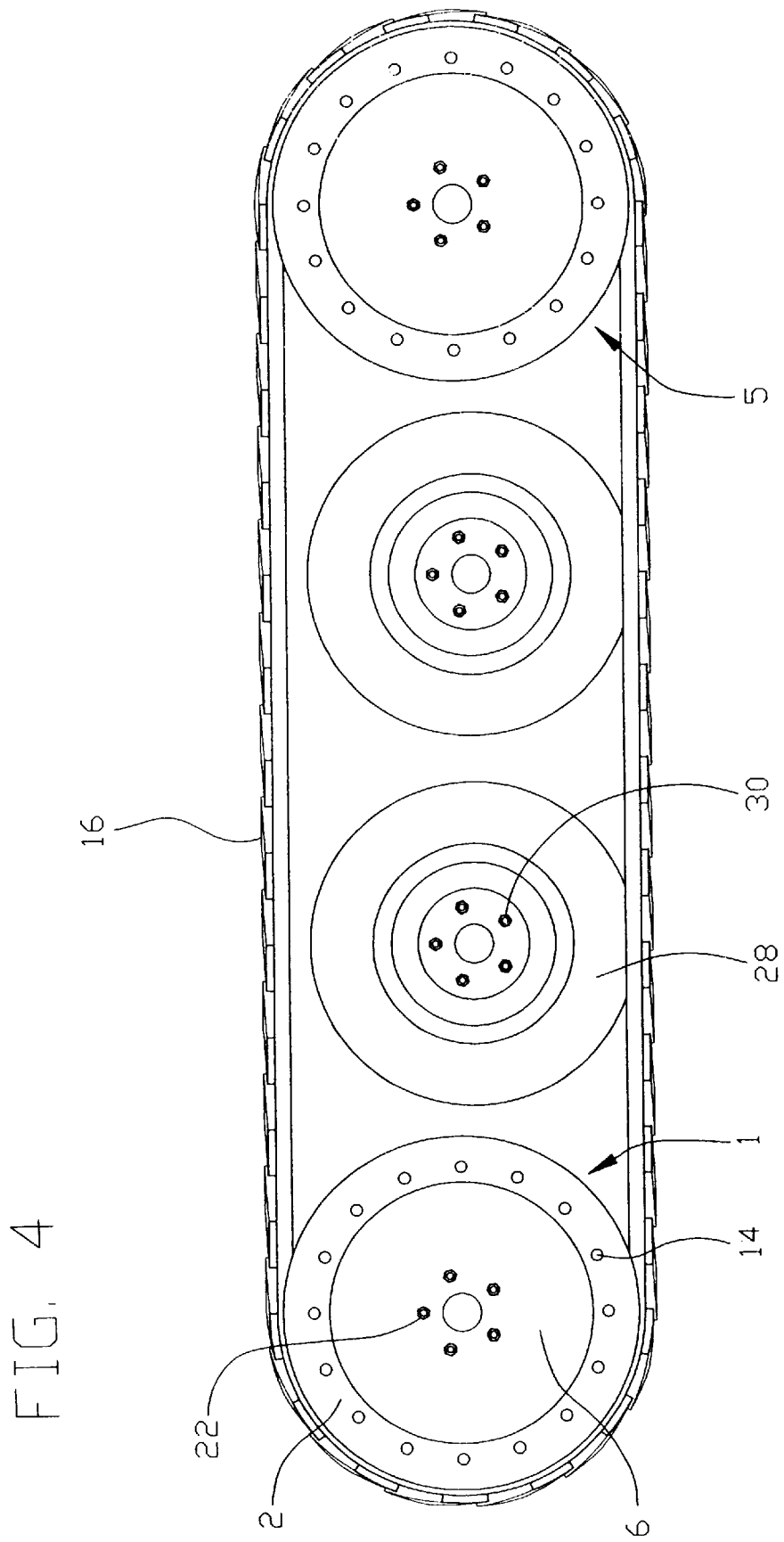
FIG. 4 is a side view of the track assembly.

Referring to FIG. 4, the continuous loop track 16 of the instant inventive track assembly preferably is composed of styrene-butadiene tire rubber reinforced with nylon plys. A preferred economical resource for obtaining such a continuous loop track 16 is a 38-inch tractor tire having a tread portion approximately eighteen inches wide. The sidewalls of such a tractor tire are cut away, leaving only the tread portion of the tire. Such a continuous loop track stretched over a rear hub 1 and a forward hub 5 as depicted in FIG. 4 provides approximately 11 square feet of ground engaging surface for enhanced ground flotation and traction.

Figure 1:
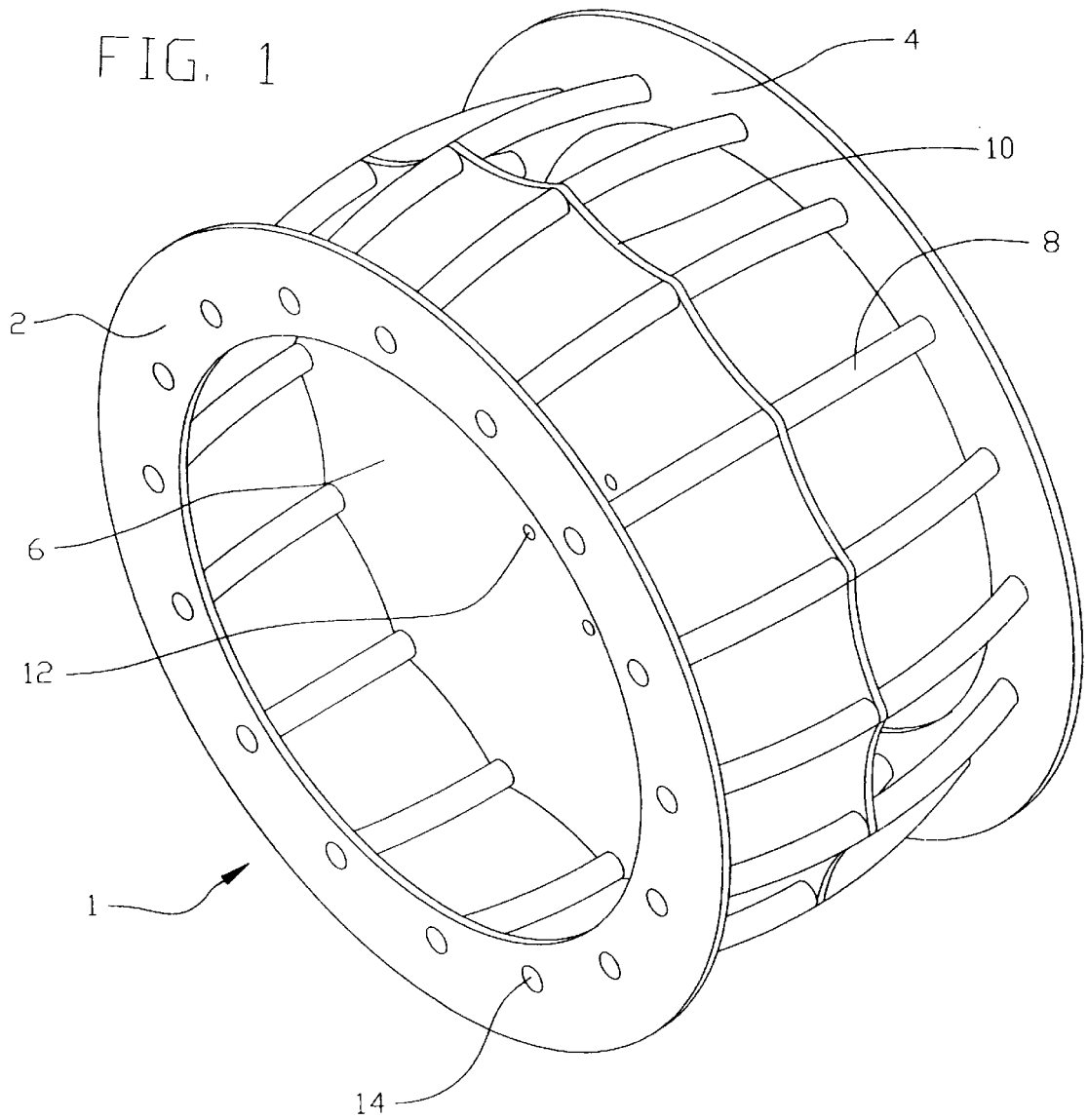
FIG. 1 is an isometric view of a hub.

Referring to FIG. 1, the drive hub 1 is centrally supported by a circular disk 6 having an inwardly scalloped edge 10. The scalloped edge 10, as depicted, provides sixteen highpoints centrally supporting sixteen crossbars 8. Preferably, at each of the sixteen highpoints around the scalloped edge 10 of the disk 6, a circular aperture is drilled, such apertures being closely fitted for receiving the crossbars 8; each crossbar 8 there being welded to the circular disk 6. Each of the crossbars 8 curves inwardly from its midpoint, their rates of curvature matching the outward curvature of the interior surface of a tire track to be installed over the hub 1. Such curvature of the crossbars 8 assures that, upon installation of such a track over the hub 1 and upon exertion of tension between the track and the hub 1, frictional contact between the crossbars 8 and the interior surface of the track is maintained. A pair of flange rings 2 and 4 provide support for the extreme left and right ends of each crossbar 8 and provide track retaining sidewalls. As depicted, each flange ring 2 and 4 has sixteen crossbar receiving apertures 14 drilled therethrough, each such aperture being fitted and positioned for receiving and retaining the ends of the crossbars 8. Upon so positioning the ends of the crossbars 8 within the apertures 14, such ends are welded in place.

An acceptable alternate configuration of the hub (not depicted) provides a circular unscalloped disk, crossbars having a square or rectangular lateral cross section, and provides unapertured flange rings. In such configuration, the ends of the crossbars are welded to the interior sidewalls of the flange rings, and the midpoints of the interior surfaces of the crossbars are welded at evenly spaced intervals to the outer peripheral surface of the circular disk. Utilization of crossbars 8 having a circular cross section, as depicted in FIG. 1, is preferable because such bars may be conveniently nested within drilled apertures 14 within the flange rings 2 and 4 and within the circular disk 6 for additional support.

Preferably, referring to FIG. 1, the flange rings 2 and 4, and the central circular disk 6 are one-half inch in thickness and are composed of steel. The crossbars 8 also preferably are composed of steel, having a ⅝ inch diameter. The crossbars also are preferably approximately 19½ inches in length, accommodating an eighteen inch wide track with approximately ¼ of an inch of side clearance from the sidewalls of the flange rings 2 and 4 on either side.

Referring further to FIG. 1, five lug receiving apertures 12 are drilled through the circular disk 6, such apertures being axially arranged in a pentagonal configuration. Referring to FIG. 4, five lug nuts 22 retain the hub 1 on a rotatable rotor, not depicted. For rotors having 4, 6 or 8 threaded lugs, corresponding lug receiving apertures are drilled through the circular disk 6.

Figure 3:
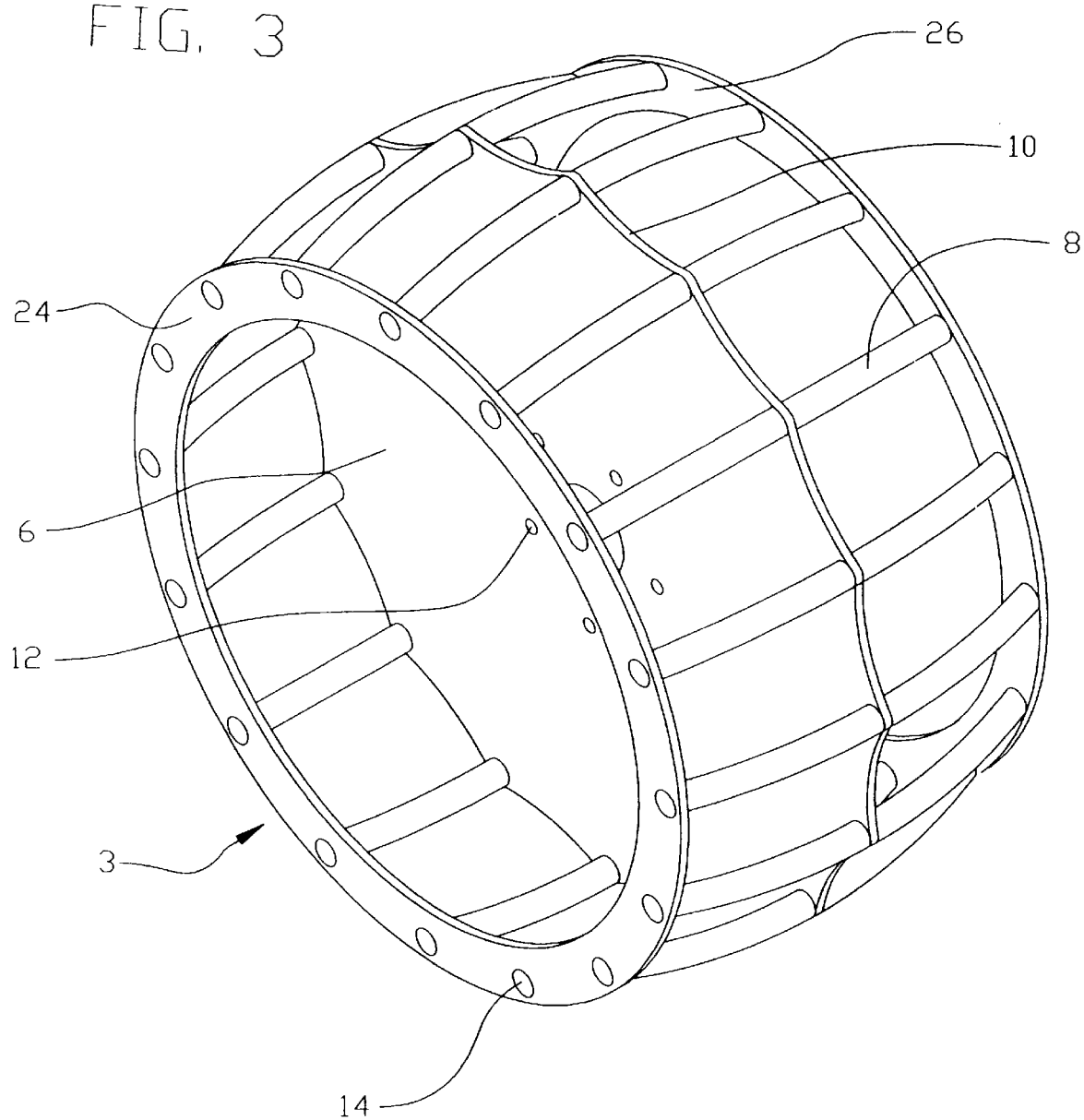
FIG. 3 is an isometric view of an alternate configuration of a hub.

The alternately configured hub 3 depicted in FIG. 3 has crossbars 8, a scalloped circular disk 6, and lug receiving apertures 12; all configured identically with corresponding elements depicted in FIG. 1. The hub 3 of FIG. 3 alternately has a pair of circular support rings 24 and 26, such rings having no radially extending flanges as do the flange rings 2 and 4 depicted in FIG. 1. The flangeless hub 3 depicted in FIG. 3 allows utilization of continuous loop tracks having a wider range of lateral width than the hub 1 depicted in FIG. 1. Where the flanged hub 1 depicted in FIG. 1 is utilized on a track laying vehicle, the width of the track can be no greater than the lateral distance between the interior surfaces of the flanges 2 and 4, and cannot be substantially less than such distance. Where the width of the track is closely fitted to the span between the two flanges 2 and 4, the outer tread surface of the track shields the outer peripheral surfaces of the flanges, preventing such surfaces from striking objects on the ground such as rocks. Where an excessively narrow track is installed on such a flanged hub, the shielding effect is lessened, increasing the risk of damage to the flange rings 2 and 4 by striking rocks and other obstructions. In contrast, the flangeless hub 3 depicted in FIG. 3, will accommodate a track slightly wider than the width of the hub 3, and it will accommodate narrower tracks without exposing the hub 3 to damaging contact with the ground. The hub 3 depicted in FIG. 3 utilizes the outwardly curved configuration of the crossbars 8 in engagement with the outwardly curved inner surface of a track installed over the hub to retain the track on the hub. In contrast, the hub 1 depicted in FIG. 1 has dual track retaining means, they being the curved crossbars 8 and the flange rings 2 and 4. Where a track laying vehicle or implement utilizing the present inventive track assembly is to laterally traverse steep slopes, the hub 1 depicted in FIG. 1 may be preferred over the hub 3 depicted in FIG. 3. For relatively flat terrain, the hub 3 may be preferred for additional flexibility in sizing of tracks.

Figure 2:
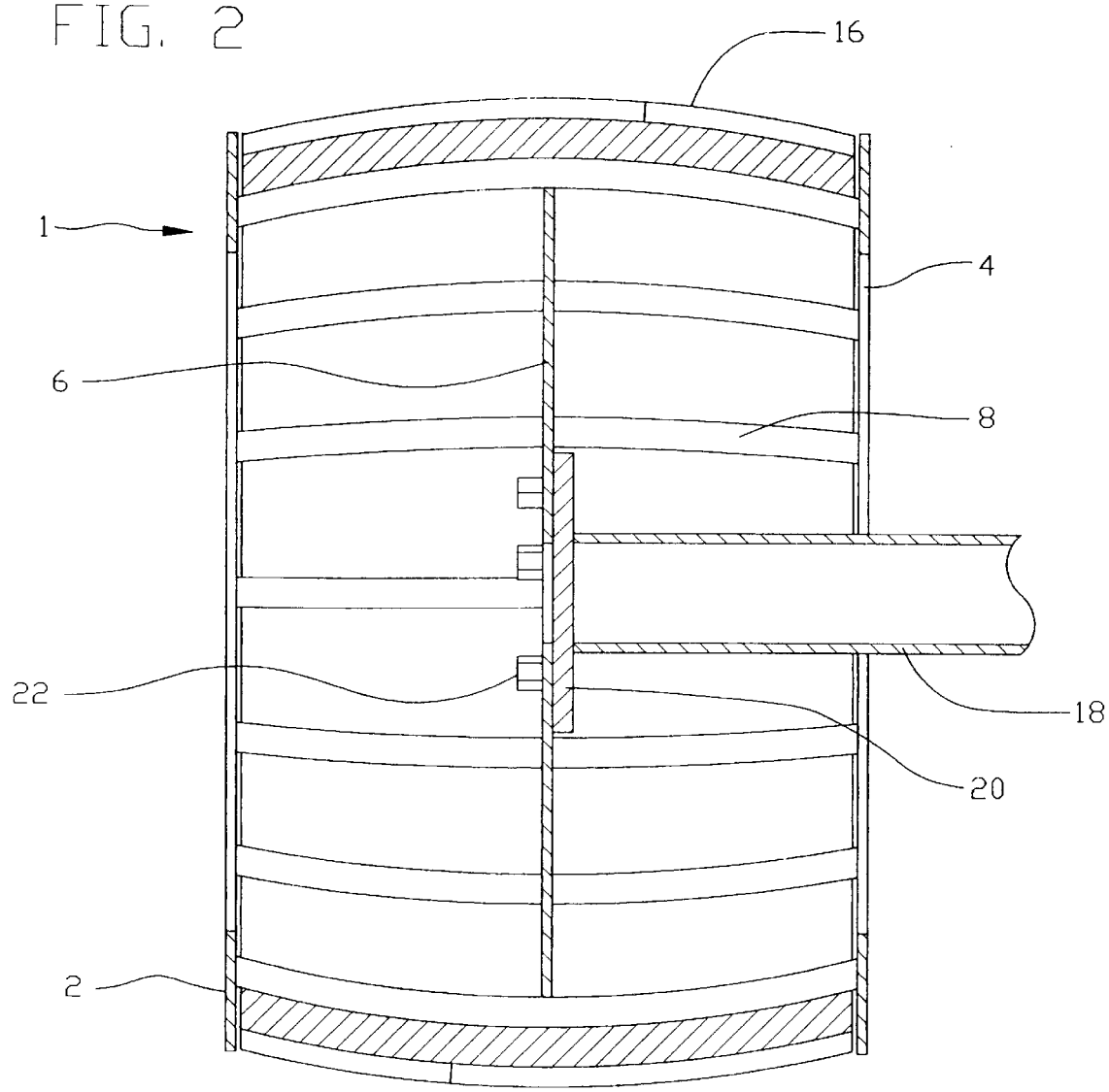
FIG. 2 is a sectional view of a hub and axle, the plane of the section being perpendicular to the plane of rotation, and including the axis of rotation.

Referring to FIG. 2, the hub 1, shown in sectional view, is shown fixedly attached to an axle 18 by means of lug nuts 22. The track 16, also shown in sectional view is outwardly curved, its curvature matching the outward curvatures of the crossbars 8. Such matching of curvatures assures that as each crossbar 8 comes into contact with the undersurface of the track 16, frictional and supporting contact is maintained along the length of the crossbar 8.

Referring to FIG. 5, as the track laying vehicle traverses muddy or snowy ground, mud or snow may fall into the interior space between the upper and lower paths of the track 16. As the vehicle forwardly travels, such mud or snow is carried rearward by the track 16 and is ingested into the interior space of the drive hub 1; passing between the crossbars 8 instead of accumulating and "clogging" the hub. Such ingestion of snow or mud is desirable because accumulation of snow or mud on the exterior radial surfaces of the hub which are normally in contact with the interior surface of the track 16, interferes with frictional contact between the hub and the track. Referring to FIG. 1, upon ingestion of snow or mud into the interior space of the hub 1, such materials are freely expelled by the motion of the hub through the central openings of the flange rings 2 and 4.

Figure 7:
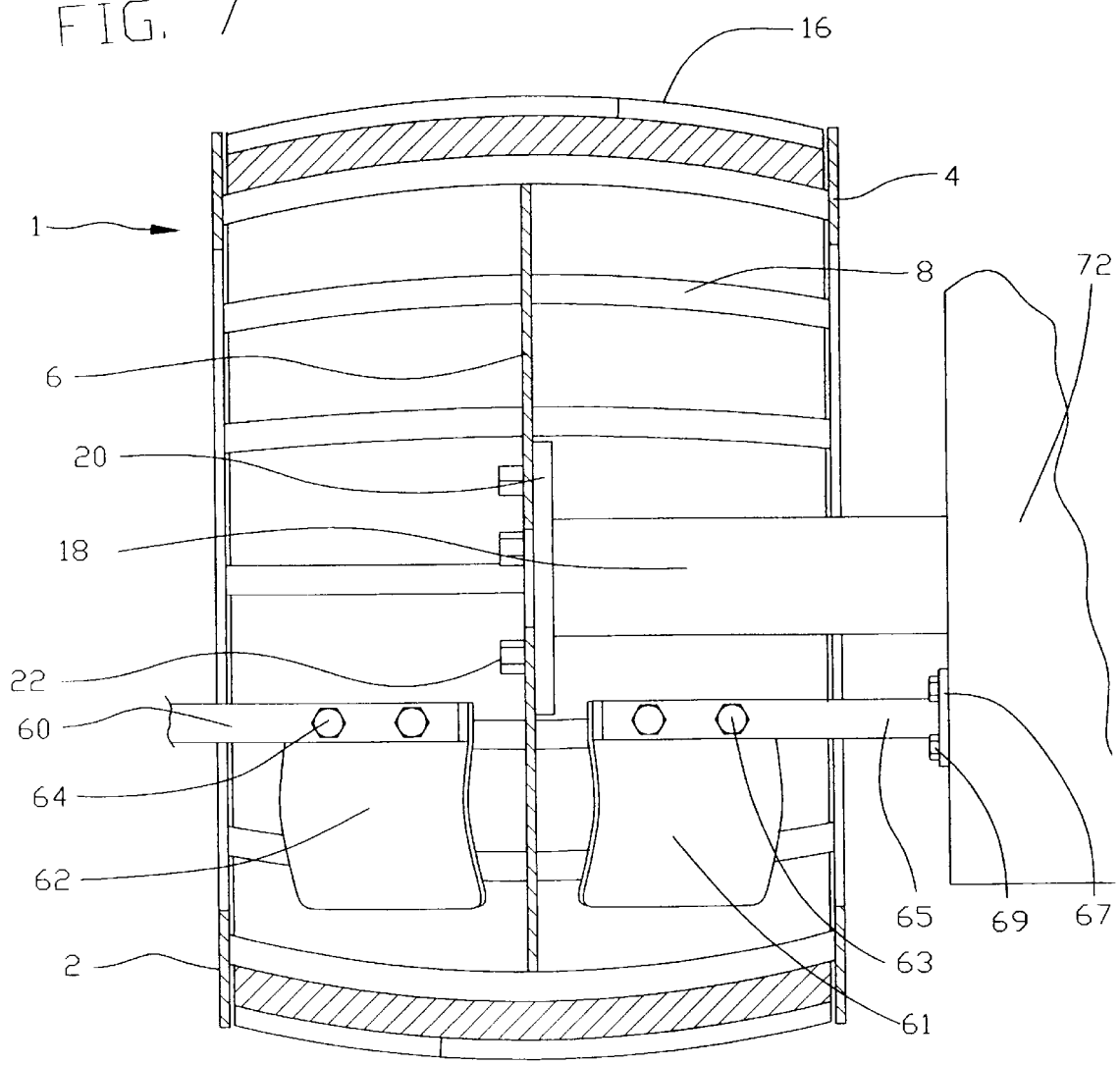
FIG. 7 is an alternate sectional view showing auxiliary snow diverters.
Figure 8:
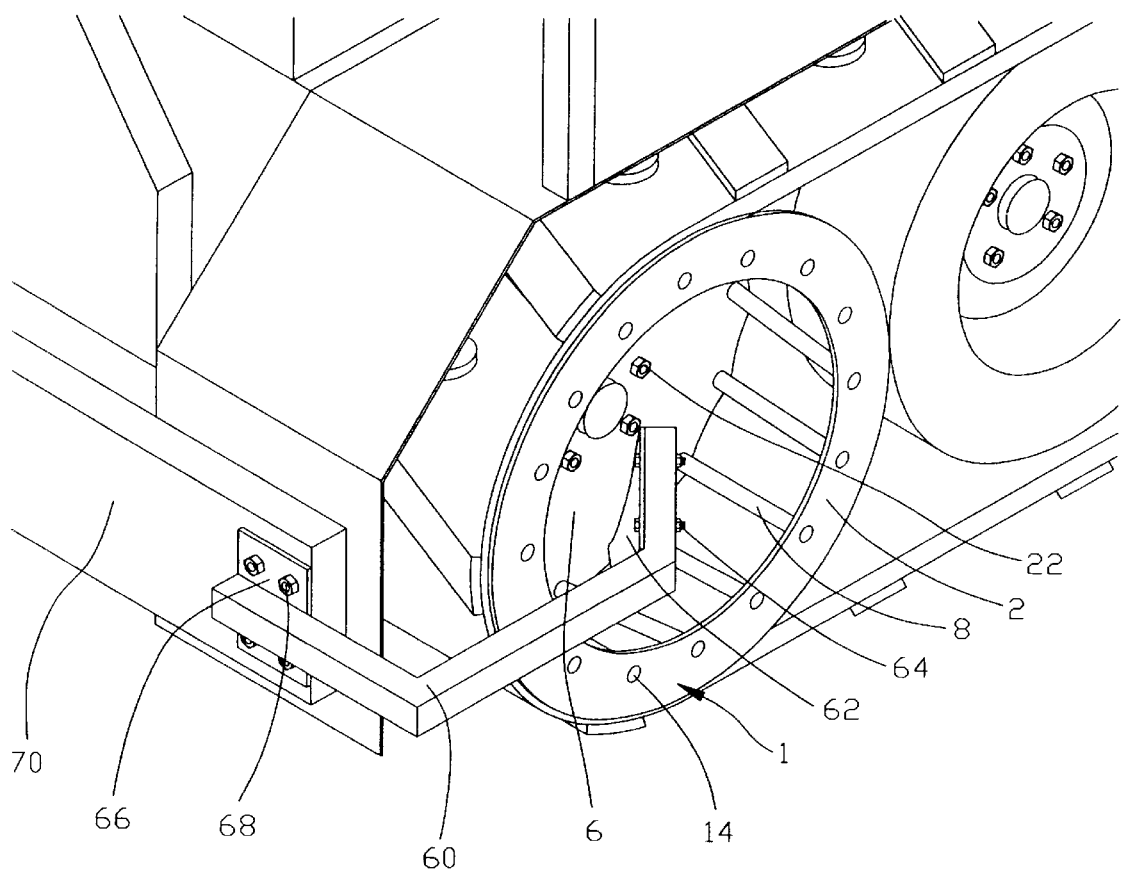
FIG. 8 is an alternate isometric view showing auxiliary snow diverters.

Referring simultaneously to FIGS. 7 and 8, auxiliary snow diverters 60 and 65 extend into the respective right and left interior spaces of the hub 1. The auxiliary snow diverters 60 and 65 have attachment plates 66 and 67, which are bolted respectively to the bumper 70 and sidewall 72 of the crawler track vehicle by means of nuts and bolts 68 and 69. Fixedly attached by means of nuts and bolts 64 and 63 to the opposite ends of the auxiliary snow diverters 60 and 65 are snow diverter plates 62 and 61. When snow conditions cause snow ingested into the interior space of the hub 1 to become packed, instead of freely flowing out of the hub 1, the auxiliary snow diverters 60 and 65 are preferably installed. The auxiliary snow diverters 60 and 65 operate to assure that snow ingested into the interior space of the hub 1 is continuously outwardly deflected, preventing undesirable internal packing of the snow.

Referring to FIG. 4, it is preferable that the track assembly of a track laying vehicle or mobile implement have a plurality of idler wheels 28 rotatably mounted on intermediate axles of the vehicle or implement by means of lug nuts 30. The idler wheels 28 prevent excessive upward travel of the track 16 in relation to the hubs 1 and 5 as the track assembly travels over ground swells or protrusions.

Figure 6:
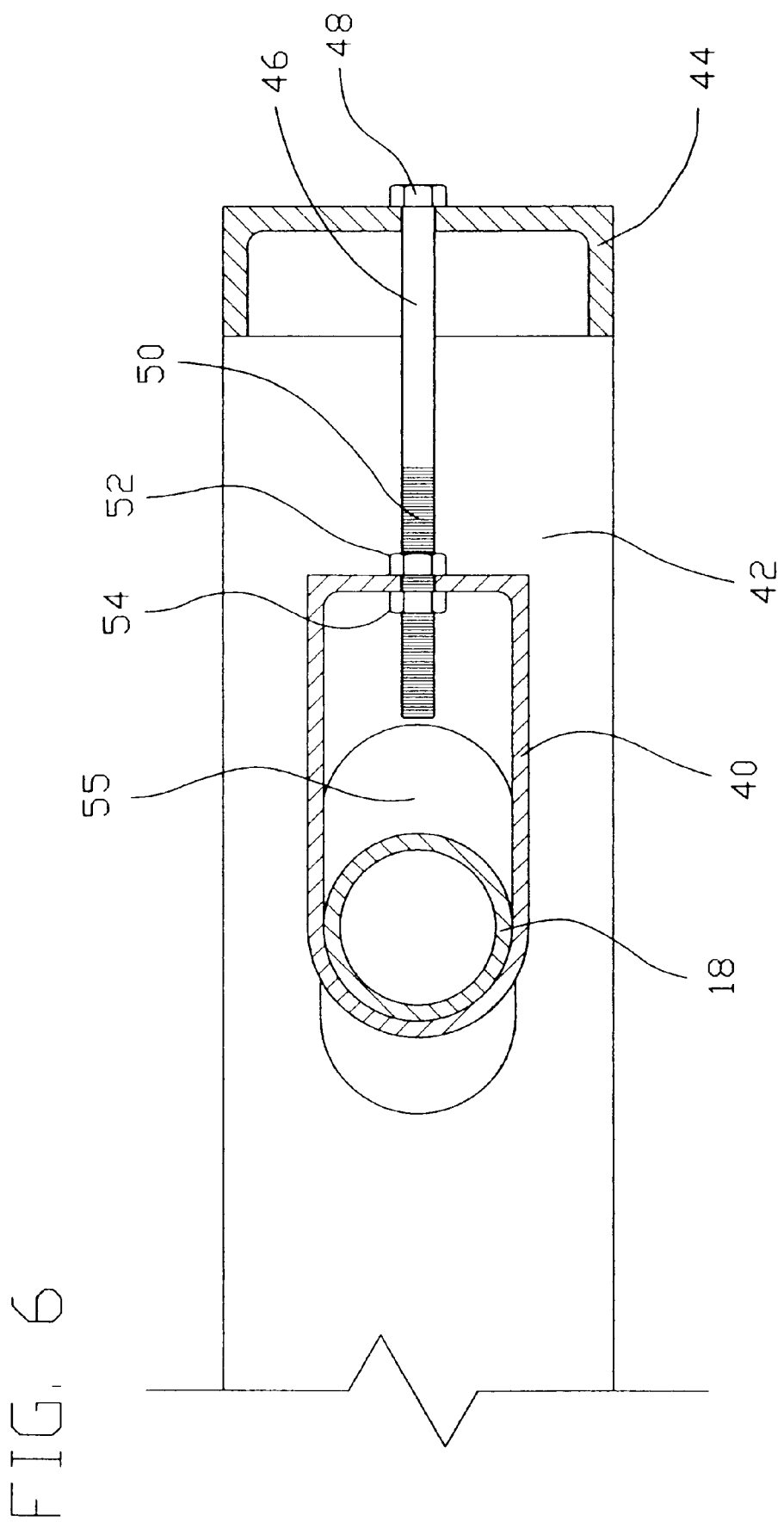
FIG. 6 is a side sectional view of a track tightening means.

Referring to FIG. 6, the major longitudinal structural support members of the track laying vehicle preferably comprise a pair of rectangular tubular beams 42; the beams 42 being interconnected at their forward ends by a rectangular channel crossbeam 44. Each longitudinal beam 42 preferably has a slotted aperture 55 for receiving and retaining, referring simultaneously to FIGS. 2 and 6, an axle 18. The axle 18 may be forcefully drawn forward by an axle pulling loop 40, such loop being threadedly attached to an axle adjustment bolt 46. The axle adjustment bolt 46 passes through a smooth walled aperture in the cross beam 44 and is retained within the aperture by an enlarged hexagonal head 48. The axle adjustment bolt 46 has spiral threads 50 along a sufficient portion of its length to allow adjustment of the axle 18 along the full length of the slot 55. The axle adjustment bolt 46 passes through a smooth walled aperture within the wall of the axle drawing loop 40, and the bolt is fixed in place by a pair of threaded nuts 52 and 54 which are welded in place upon the sidewalls of the axle drawing loop 40. In order to forcefully draw the axle 18 forward, a wrench is applied to the hexagonal bolthead 48 and the bolt is turned in a clockwise motion. Such motion, through engagement of the spiral threads 50 with the threaded nuts 52 and 54, pulls the axle drawing loop 40 forward, pulling with it the axle 18 resulting in tightening of tracks mounted over the vehicle's hubs. In order to loosen the axle 18 for removal and replacement of a track, the bolthead 48 is simply turned in a counter-clockwise motion, thrusting rearward the axle drawing loop 40, and allowing the axle 18 to slide rearwardly through the axle receiving slot 55.

While the principles of the invention have been made clear in the above illustrative embodiments, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A track assembly comprising:
   (a) a rotatable hub, the rotatable hub comprising a plurality of track support members, each track support member having a first and a second end, each track support member extending from its first end to its second end along an outwardly curved path, the rotatable hub further comprising a suspending and positioning means capable of fixedly suspending the track support members in a circular pattern; the suspending and positioning means so suspending and positioning the track support members; and,
   (b) a rubber or elastomeric track having an exterior ground engaging tread surface, and having an interior hub engaging surface, the hub engaging surface of the rubber or elastomeric track being in frictional contact with a plurality of the rotatable hub's track support members.

2. The track assembly of claim No. 1, further comprising a second rotatable hub comprising a plurality of second track support members, each second track support member having a first and a second end, each second track support member extending from its first end to its second end along an outwardly curved path; the second rotatable hub further comprising a second suspending and positioning means capable of fixedly suspending the second track support members in a circular pattern, such means so suspending and positioning such members; a plurality of the second track support members being in frictional contact with the hub engaging surface of the rubber or elastomeric track.

3. The track assembly of claim No. 2, further comprising a pair of hub mounting means capable of fixedly and rotatably attaching the rotatable hubs to a track laying vehicle or track laying implement, each hub mounting means being fixedly attached to one of the rotatable hubs.

4. The track assembly of claim No. 3, wherein the rubber or elastomeric track comprises a pneumatic tire having a portion of each of its sidewalls removed.

5. The track assembly of claim No. 4, further comprising a tensioning means adapted for fixed attachment to one of the hub mounting means, the tensioning means being capable, upon such attachment, of applying thereto either a pushing or a pulling force; the tensioning means being further capable upon such attachment of drawing apart the hub mounting means; the tensioning means being fixedly attached to one of the hub mounting means.

6. The track assembly of claim No. 5, further comprising a plurality of idler wheels, each idler wheel having an exterior radial surface, the exterior radial surface of each idler wheel being in rolling contact with the interior hub engaging surface of the rubber or elastomeric track; each idler wheel being positioned between the rotatable hubs.

7. The track assembly of claim No. 6, further comprising a plurality of idler wheel rotatable mounting means, each such means being capable of fixedly and rotatably attaching an idler wheel to a track laying vehicle or implement; each idler wheel rotatable mounting means being fixedly attached to one of the idler wheels.

8. A track assembly comprising:
(a) a rotatable hub, the rotatable hub comprising a plurality of track support members, each track support member having an outwardly curved outer surface, the rotatable hub further comprising a suspending and positioning means capable of fixedly suspending the track support members in a circular pattern; the suspending and positioning means so suspending and positioning the track support members; and,
(b) a rubber or elastomeric track having an exterior ground engaging tread surface, and having an interior hub engaging surface, the hub engaging surface of the rubber or elastomeric track being in frictional contact with the outer surfaces of a plurality of the rotatable hub's track support members; the track support members comprising a plurality of circumferentially spaced bars, each such bar having an interior surface, a first end, a second end, and being outwardly curved; and wherein the suspending and positioning means comprises a circular plate having a right wall, a left wall, a central radial axis, and an annular outer periphery, each circumferentially spaced bar being fixedly attached to and positioned upon such plate so that such bar's interior surface is in contact with the annular outer periphery of such plate, and so that such bar's first and second ends, respectively, outwardly extend from the right and left walls of such plate.

9. The track assembly of claim No. 8, further comprising an inner support ring and an outer support ring, each such ring having a right wall, a left wall, and an annular outer periphery; the second end of each circumferentially spaced bar being fixedly attached to the right wall of the inner support ring, and the first end of each circumferentially spaced bar being fixedly attached to the left wall of the outer support ring.

10. The track assembly of claim No. 9, wherein the inner support ring comprises an inner track retaining flange; wherein the outer support ring comprises an outer track retaining flange; and wherein the rubber or elastomeric track is fitted so that it may lie between such flanges.

11. The track assembly of claim No. 10, further comprising a second rotatable hub, comprising a plurality of second track support members, each second track support member having an outwardly curved outer surface; the second rotatable hub further comprising a second suspending and positioning means capable of fixedly suspending the second track support members in a circular pattern, such means so suspending and positioning such members; the outwardly curved outer surfaces of a plurality of the second track support members being in frictional contact with the hub engaging surface of the rubber or elastomeric track.

12. The track assembly of claim No. 9, wherein the second track support members comprise a second plurality of circumferentially spaced bars, each such bar having an interior surface, a first end, a second end, and being outwardly curved; and wherein the second suspending and positioning means comprises a second circular plate having a right wall, a left wall, a central radial axis, and an annular outer periphery, each such circumferentially spaced bar being fixedly attached to and positioned upon such plate so that such bar's interior surface is in contact with the annular outer periphery of such plate, and so that such bar's first and second ends, respectively, outwardly extend from the right and left walls of such plate.

13. The track assembly of claim No. 12, further comprising a second inner support ring and a second outer support ring, each such ring having a right wall, a left wall, and an annular outer periphery; the second ends of the second plurality of circumferentially spaced bars being fixedly attached to the right wall of the second inner support ring, and the first ends of such bars being fixedly attached to the left wall of the second outer support ring.

14. The track assembly of claim No. 13, wherein the second inner support ring comprises second inner track retaining flange; wherein the second outer support ring comprises a second outer track retaining flange; and wherein the lengths of bars among the second plurality of circumferentially spaced bars are fitted so that the rubber or elastomeric track may lie between such flanges.

15. The track assembly of claim No. 14, further comprising a pair of hub mounting means capable of fixedly and rotatably attaching the rotatable hubs to a track laying vehicle or implement; each hub mounting means being fixedly attached to one of the rotatable hubs.

16. The track assembly of claim No. 15, further comprising a tensioning means adapted for fixed attachment to one of the hub mounting means, the tensioning means being capable, upon such attachment, of applying thereto either a pushing or a pulling force; the tensioning means being further capable upon such attachment of drawing apart the hub mounting means; the tensioning means being fixedly attached to one of the hub mounting means.

17. The track assembly of claim No. 16, further comprising a plurality of idler wheels, each idler wheel having an exterior radial surface, the exterior radial surface of each idler wheel being in rolling contact with the interior hub engaging surface of the rubber or elastomeric track, each idler wheel being positioned between the rotatable hubs.

18. The track assembly of claim No. 17, further comprising a plurality of idler wheel rotatable mounting means, each such means being capable of fixedly and rotatably attaching an idler wheel to a track laying vehicle or implement; each idler wheel rotatable mounting means being fixedly attached to one of the idler wheels.

19. The track assembly of claim No. 18, wherein the hub mounting means comprise a pair of axles.

20. The track assembly of claim No. 19, wherein the tensioning means comprises a screw tightener having a first end and having a second end, the first end of the screw tightener being adapted for fixed attachment to one of the axles, and the second end of the screw tightener being adapted for attachment to a frame member of a track laying vehicle or implement.

21. The track assembly of claim No. 20, wherein each idler wheel comprises a pneumatic tire mounted upon a tire rim, and wherein each idler wheel mounting means comprises an idler wheel axle.

* * * * *